(12) United States Patent
Benayoun et al.

(10) Patent No.: US 7,751,312 B2
(45) Date of Patent: Jul. 6, 2010

(54) SYSTEM AND METHOD FOR PACKET SWITCH CARDS RE-SYNCHRONIZATION

(75) Inventors: Alain Benayoun, Cagnes sur Mer (FR); Patrick Michel, La Gaude (FR); Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 1412 days.

(21) Appl. No.: 10/860,293

(22) Filed: Jun. 3, 2004

(65) Prior Publication Data

US 2004/0264457 A1  Dec. 30, 2004

(30) Foreign Application Priority Data

Jun. 13, 2003  (EP) .................................. 03368051

(51) Int. Cl.
*G01R 31/08* (2006.01)
(52) U.S. Cl. .................. 370/219; 370/216; 370/389; 370/395.1; 370/395.52; 370/395.53; 370/395.62; 370/428; 370/429; 370/217; 370/218; 370/220; 711/154; 711/156; 711/162; 714/4; 714/11; 714/12; 714/13; 714/5; 714/6; 714/7
(58) Field of Classification Search ......... 370/216–220, 370/389, 395.62, 509, 395, 395.1, 395.52, 370/395.53, 428, 429; 711/154, 156, 162; 714/4–7, 11, 12, 13
See application file for complete search history.

(56) References Cited

U.S. PATENT DOCUMENTS

| | | | |
|---|---|---|---|
| 5,969,649 A * | 10/1999 | Ashley et al. ................. 341/59 |
| 6,240,105 B1 * | 5/2001 | Zetts ........................... 370/503 |
| 6,259,693 B1 * | 7/2001 | Ganmukhi et al. ........... 370/366 |
| 6,418,144 B1 * | 7/2002 | Saeki ....................... 370/395.6 |
| 6,910,148 B1 * | 6/2005 | Ho et al. ......................... 714/4 |
| 6,920,156 B1 * | 7/2005 | Manchester et al. ......... 370/522 |
| 6,944,182 B1 * | 9/2005 | Amagai et al. .............. 370/466 |
| 7,006,498 B2 * | 2/2006 | Benayoun et al. ........... 370/392 |
| 7,184,441 B1 * | 2/2007 | Kadambi et al. ............. 370/400 |
| 7,190,674 B2 * | 3/2007 | Kobayakawa et al. ....... 370/235 |
| 7,269,133 B2 * | 9/2007 | Lu et al. ...................... 370/219 |
| 7,304,941 B2 * | 12/2007 | Benayoun et al. ........... 370/218 |
| 7,535,827 B2 * | 5/2009 | Rusmisel et al. ............ 370/219 |
| 2002/0124204 A1 * | 9/2002 | Liu et al. ....................... 714/11 |
| 2004/0100899 A1 * | 5/2004 | Mahamuni .................. 370/216 |
| 2005/0078600 A1 * | 4/2005 | Rusmisel et al. ............ 370/217 |

\* cited by examiner

*Primary Examiner*—Aung S Moe
*Assistant Examiner*—Christopher P Grey
(74) *Attorney, Agent, or Firm*—Mark E. McBurney; Schubert Osterrieder & Nickelson PLLC

(57) ABSTRACT

The disclosed invention relates to a re-synchronization system that operates in a switching arrangement receiving a plurality of incoming data packets. The switching arrangement is made of an active switch card that transmits the incoming data packets and a backup switch card that may be re-activated by an operator after replacement. The re-synchronization system is implemented in each switch card. When the backup switch card is re-activated, both switch cards receive the incoming data packets and the system of the invention allows to re-synchronized both switch cards by controlling the transmission of the incoming data packets out of each switch card until the same data packets are transmitted. The re-synchronization system further comprise storage for storing the incoming data packets and detector for detecting a re-synchronization information among the incoming data packets.

11 Claims, 14 Drawing Sheets

SYSTEM AND METHOD FOR PACKET SWITCH CARDS RE-SYNCHRONIZATION

TECHNICAL FIELD

The present invention relates to the transmission of data packets such as ATM packets between Local Area Networks (LAN) interconnected by a switch engine and relates in particular to a packet loss less system and method for packet switch cards re-synchronization.

BACKGROUND ART

Local Area Networks (LAN) such as Ethernet or token-ring networks, are generally interconnected through hubs. The hub is a system made of LAN adapters that communicate together through a switch card. The switch card is mainly composed of input ports, output ports and a shared memory.

The data packets received by the input ports are stored into the shared memory at address locations determined by queues containing the packet destination addresses. Then the packets are de-queued to be transmitted to the destination output ports.

Any hardware failure on the switch card is damageable on the data packet transfer, and one common solution to prevent any hardware failure is to duplicate the switch card.

This solution consists in having two switch cards, where one switch is active while the other is backup. During normal operation, both switches operate in parallel meaning that:
- they both receive the same commands coming from a Control Point of the switching system;
- they both receive the same data packets coming from the LAN adapters;
- they both transmit the same data packets. However, the LAN adapters receive the data packets from only the active switch card.

In case of the active switch card replacement, the backup switch card is substituted to the active one and operates in place of this latter. The LAN adapters then receive the data packets from the newly connected backup switch. When the active switch card is re-activated, a major difficulty is to have the two switches re-synchronized on the same data packets. This problem is not solved in the existing switch systems which admit lost data packets.

Therefore there is a need for a packet loss less system for data packet switch re-synchronization. The present invention offers such system.

SUMMARY OF THE INVENTION

Accordingly, the main object of the invention is to provide a packet loss less re-synchronization system and associated method to process data transfer through active and backup switch cards without losing any data packet.

In a preferred embodiment, the re-synchronization system operates in a switching arrangement that receives a plurality of incoming data packets. The switching arrangement is made of an active switch card that transmits the incoming data packets and a backup switch card that may be re-activated by an operator after replacement. The re-synchronization system is implemented in each switch card. When the backup switch card is re-activated, both switch cards receive the incoming data packets and the system of the invention allows to re-synchronized both switch cards by controlling the transmission of the incoming data packets out of each switch card until the same data packets are transmitted. The re-synchronization system further comprise means for storing the incoming data packets and means for detecting a re-synchronization information among the incoming data packets.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
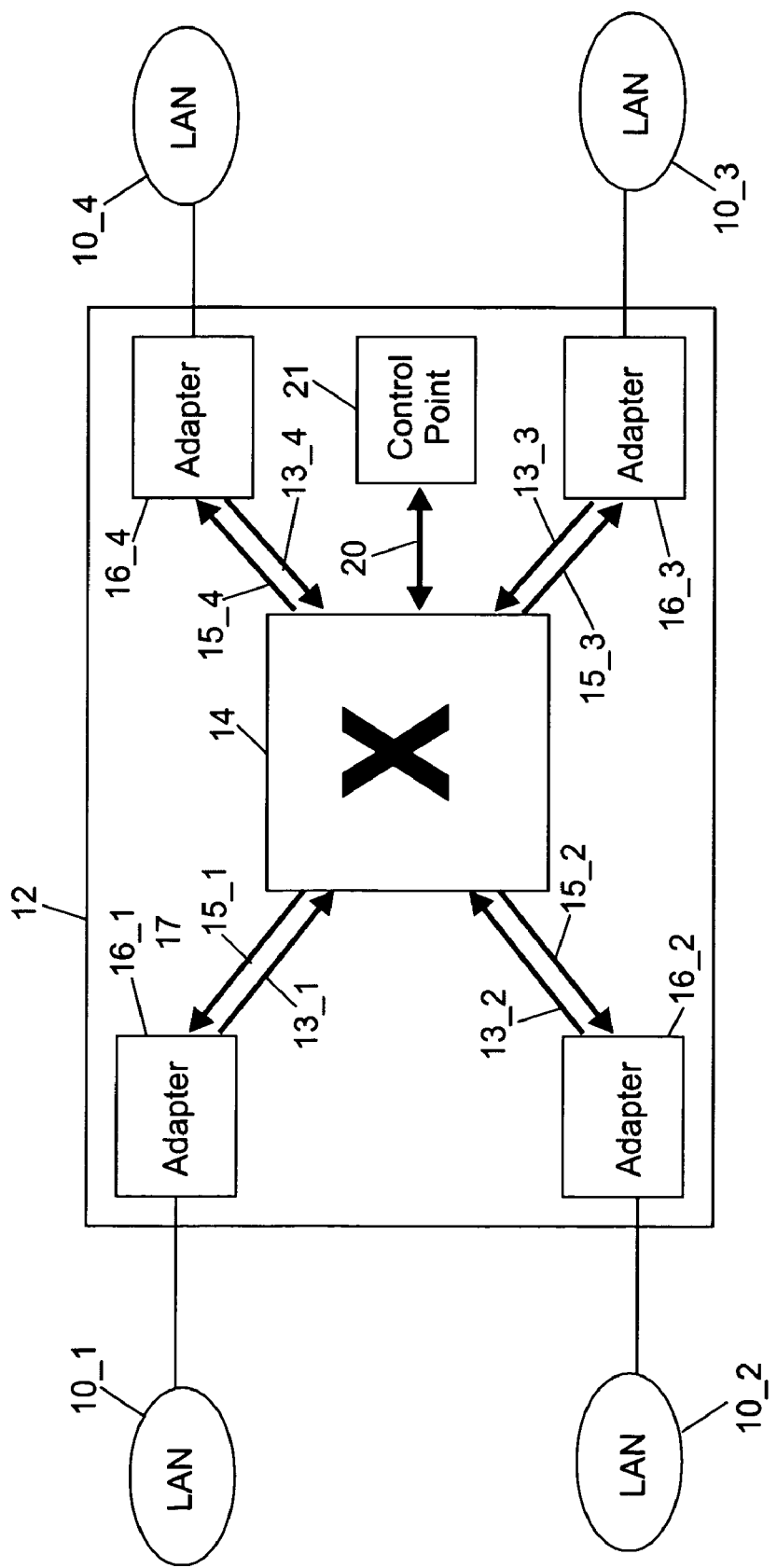
FIG. 1 is a schematic block diagram of a data transmission system including four LANs interconnected by a hub according to the principles of the invention.

The invention is preferably implemented in a data transmission environment as illustrated on FIG. 1. For sake of simplicity, the environment is made of four Local Area Networks (LAN) 10_1, 10_2, 10_3, and 10_4 but it could be extended to a plurality of LANs and as such a LAN is also denoted 10_i in the description. LANs 10_i are interconnected together by a hub 12 that may be of the type ATM, Ethernet, or token-ring. Each LAN is connected to a switching system 14 within the hub 12 by means of a respective adapter card 16_1 for LAN 10_1, adapter card 16_2 for LAN 10_2, adapter card 16_3 for LAN 10_3 and adapter card 16_4 for LAN 10_4. Each adapter card (also denoted 16_i) sends data packets by means of a data bus-in (bus-in 13_1 to bus-in 13_4) connected to input ports of the switching system 14. Each adapter card receives data packets by means of a data bus-out (bus-out 15_1 to bus-out 15_4) connected to output ports of the switching system 14. Then, a data bus-in 13_i carries data packets from the respective adapter card 16_i to switching system 14 and data bus-out (15_i) carries data packets from switching system 14 to the adapter card 16_i.

Figure 2:
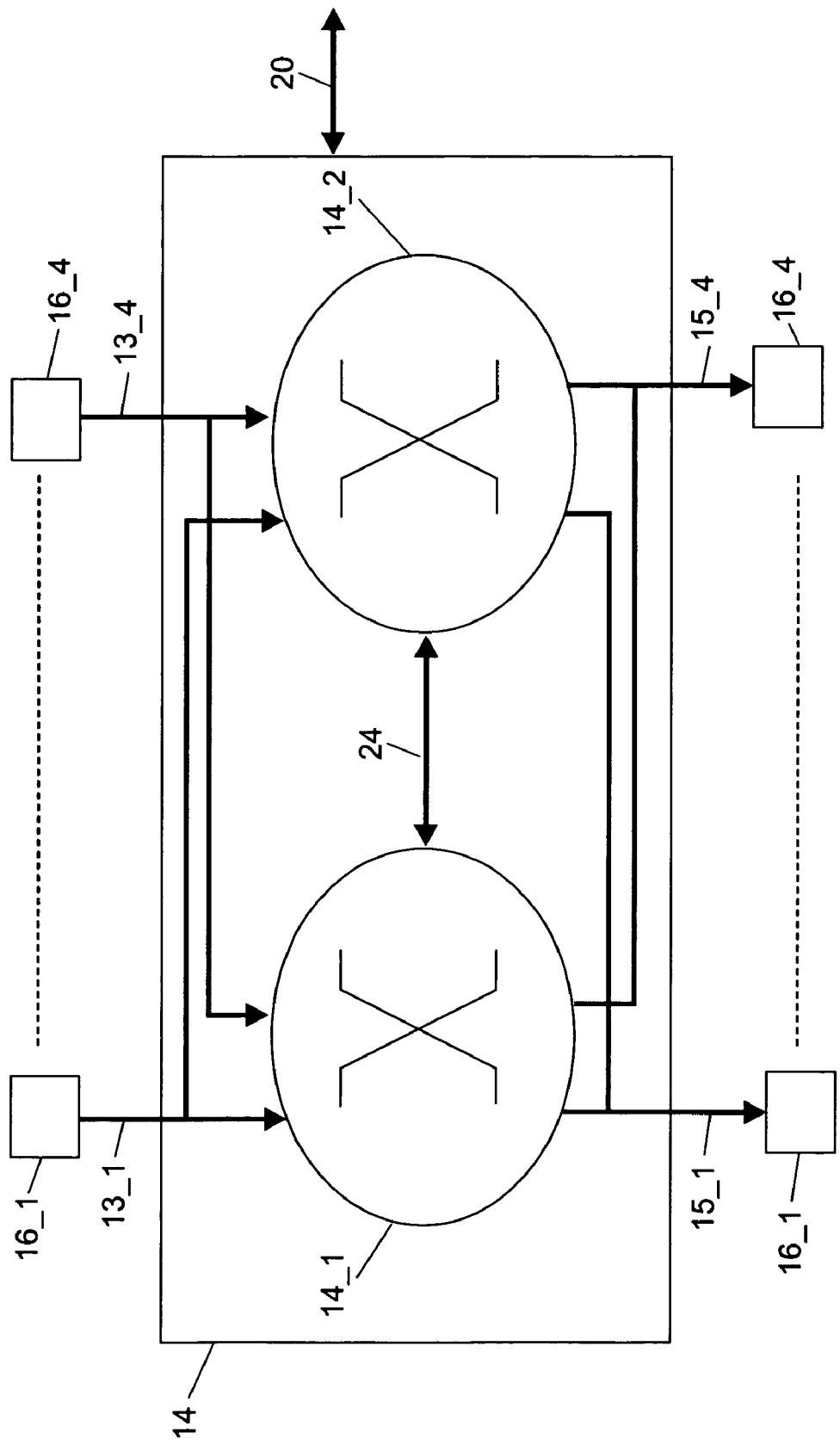
FIG. 2 represents schematically a redundant switching system where each adapter transfers/receives data packets to/from the two switches.

Referring now to FIG. 2, the switching system 14 is zoomed. Switching system is made of two distinct switch cards, an active switch card 14_1 and a backup switch card 14_2. These two switch cards communicate through a switch bus 24 and are controlled by Control Point card block 21 through bus 20. The system of the invention is preferably implemented within the transmit data path of each switch card. Each switch card contains a control system operating with a shared memory in read operations. The two control systems communicate together through the switch bus 24 to perform the data packet re-synchronization.

As it will be further detailed, after a switch card replacement, the operator enters a command through the Control Point device to allow each adapter to send a specific data packet herein called 're-synchronisation data packet' for each priority level.

Generally, a data packet is made of a header and a payload. The header contains information such as a destination address, a priority level, and the payload contains the data. To operate the re-synchronisation method of the present invention, a specific bit called the 're-synch bit' is set within the header of the re-synchronisation data packet. The re-synch bit is active only for each re-synchronisation data packet while is inactive for the normal flow of data packets.

Figure 3:
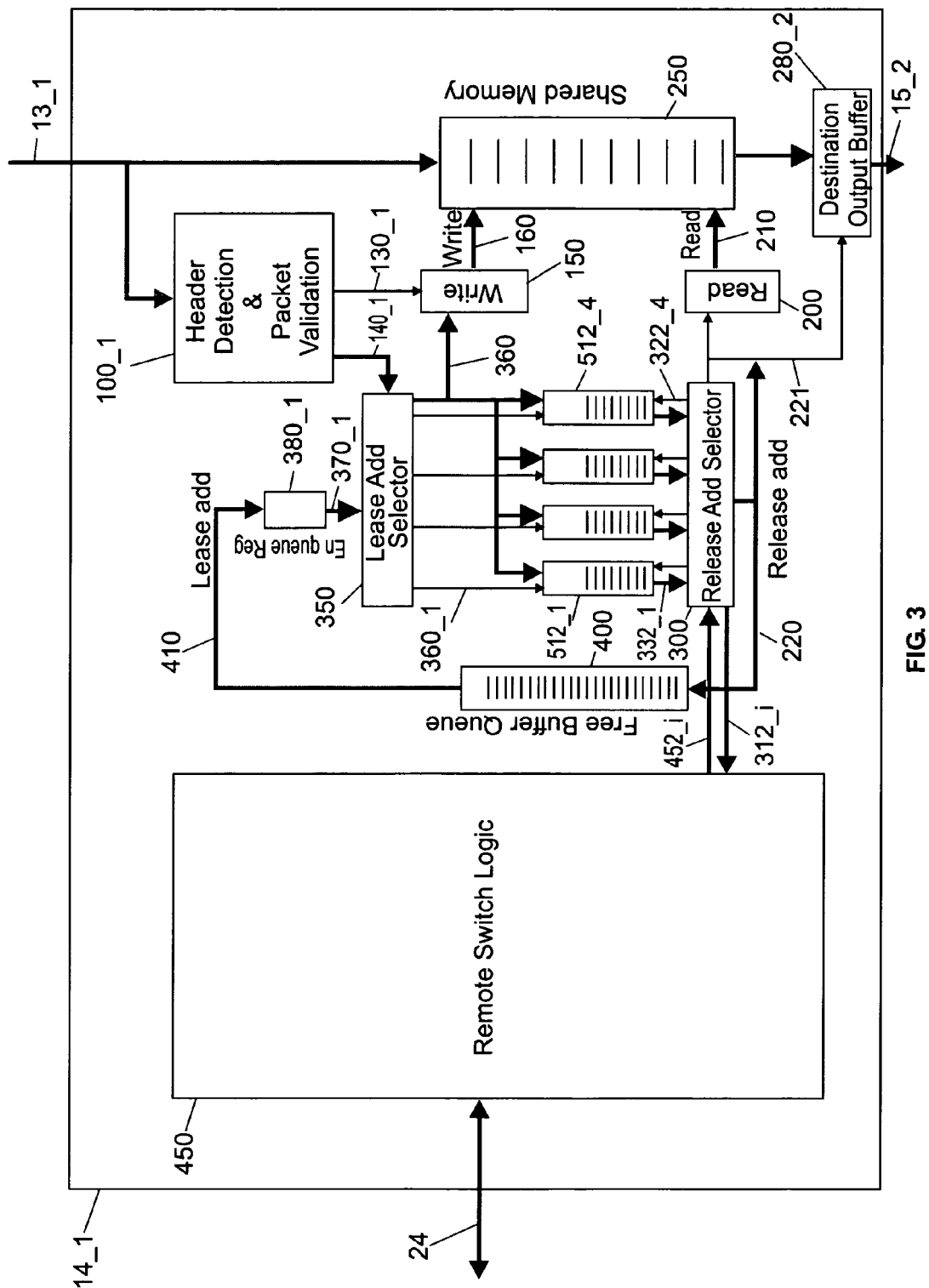
FIG. 3 is a schematic block diagram of the incoming data packet flow structure located on each switch card of FIG. 2.

Referring now to FIG. 3, the system of the invention is illustrated as part of one switch card. For the ease of description, the transmission of data packets is exemplified for data packets issued from adapter card 16_1 on data bus-in 13_1, switched through active switch 14-1 and send to adapter card 16_2 on data bus-out 15_2.

It is to be easily understood that adapter cards 16_1 and 16_2 along with the number of priorities (up to four levels in this description) are only taken as example. In the preferred embodiment, each switch card is mainly composed of:
- a Shared Memory 250;
- a Header Detection and Packet Validation block 100_1;
- a Memory Write entity made of:
  - an En-queue Register block 380_1,
  - a Lease Address Selector block 350,
  - a Memory Write Controller block 150;
- a Memory Read entity made of:
  - four De-queue Priority FIFO's blocks 512_1, 512_2, 512_3 and 512_4,
  - a Release Address Selector block 300,
  - a Memory Read Controller block 200,
  - a Destination Output Buffer block 280_2;
- a Free Buffer Queue block 400; and
- a Remote Switch Logic block 450.

The structure and operating of the different blocks are now described.

Shared Memory (250):

The Shared Memory receives data packets from adapter card 16_1 on data bus-in 13_1 and transmits them to adapter card 16_2 on data bus-out 15_2 through the Destination Output Buffer block 280_2. Write and Read operations within the Shared Memory are respectively controlled by bus 160 and by bus 210.

Header Detection and Packet Validation (100_1):

The Header Detection and Packet Validation block 100_1 receives data packets from adapter card 16_1 through data bus-in 13_1. When a valid data packet is detected, the destination address, the priority level and the re-synch bit are extracted and generated on bus 140_1. Therefore this bus is made of the destination address bus, four priority level signals and one re-synch signal. Simultaneously, a write enable signal 130_1 is activated.

Memory Write Entity:

The Memory Write Entity is made of the En-queue Register block 380_1, the Lease Address Selector block 350 and the Memory Write Controller block 150.

Figure 4:
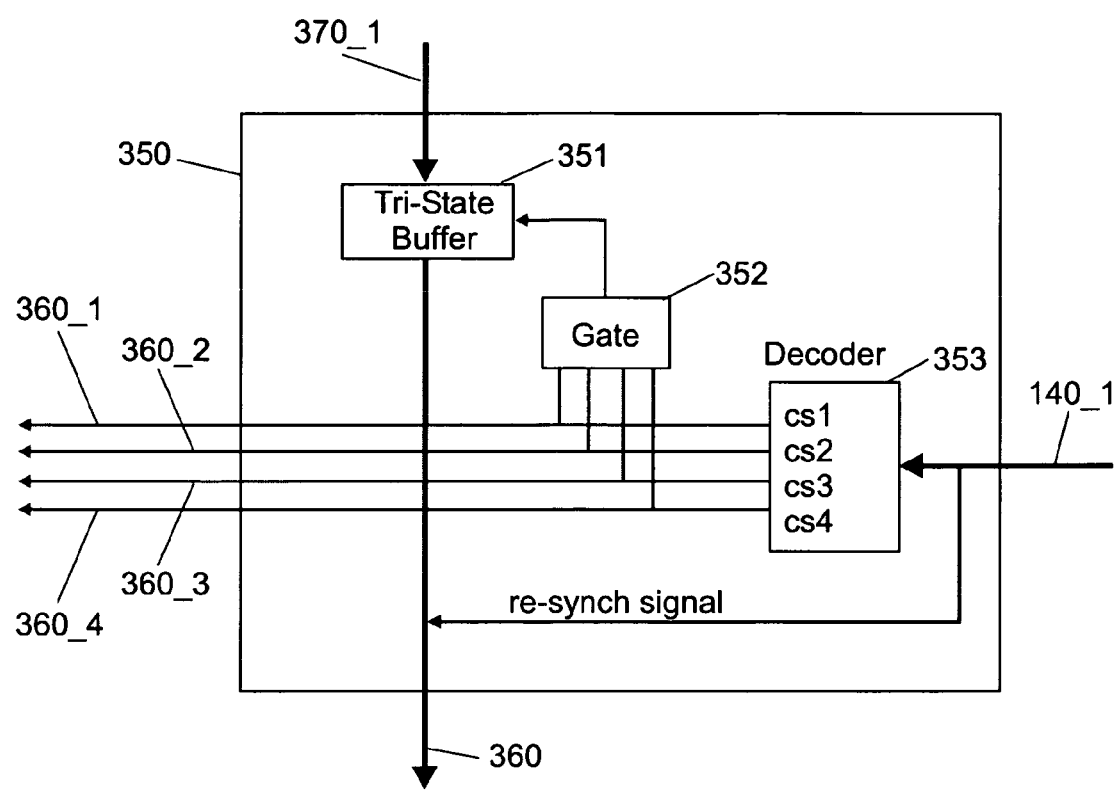
FIG. 4 details the Lease Address Selector block of FIG. 3.

To detail each task:
a. The En-queue Priority Register block 380_1 contains the memory address where to store an incoming data packet. The address comes from the Free Buffer Queue block 400 through bus 410. The output bus 370_1 is connected to the Lease Address Selector block 350.
b. The Lease Address Selector block 350 is detailed in FIG. 4. Its function is to transfer to the De-queue Priority FIFOs the memory address stored into the En-queue Register block 380_1 through a Buffer block 351 along with a re-synch signal 140_11 derived from bus 140_1. These two information are carried onto bus 360. This buffer block 351 is controlled by a decode logic made of a Decoder block 353 and a Gate block 352. The Decoder block 353 receives the destination address and the priority level of the incoming data packet on bus 140_1. In our example, for the destination address of port #2, only one chip select signal is activated among the four priority signals 360_1, 360_2, 360_3, 360_4. These chip select signals are carried out to the Remote Switch Logic block 450 and to four De-queue Priority FIFO's of port #2 blocks 512_1, 512_2, 512_3 and 512_4.

c. The Memory Write Controller block 150 controls the Shared Memory block 250 through bus 160. The write address is available on bus 360 and the write command is available on signal 130_1.

Memory Read Entity:

The Memory Read Entity is made of the four De-queue Priority FIFO's blocks 512_i, the Release Address Selector block 300 and the Memory Read Controller block 200.

Figure 5:
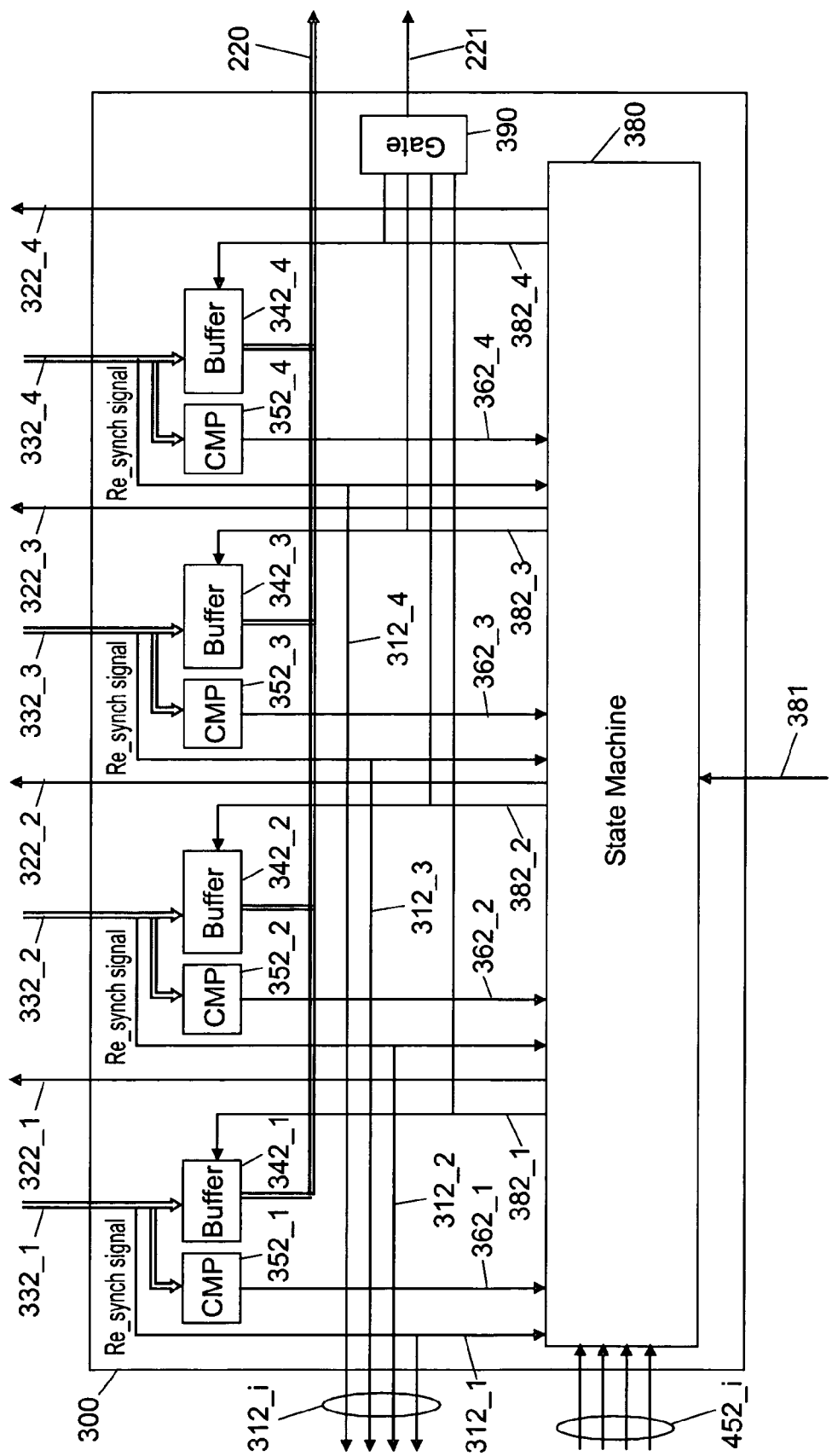
FIG. 5 details the Release Address Selector block of FIG. 3.

To detail each task:
a. When an incoming data packet is stored into the shared memory block 250, the content of bus 360_i (re-synch signal and memory address of the incoming packet) are stored into the corresponding De-queue Priority FIFO block 512_i. The four input FIFO data busses are dotted and connected to bus 360. Each input FIFO write signal is connected to a chip select signal 360_i. The four output FIFO data busses 332_i and the four input FIFO read signal 322_i are connected to the Release Address Selector block 300.
b. The Release Address Selector block 300 for destination adapter 16_2 is detailed in FIG. 5. Its function is to de-queue memory read addresses and corresponding re-synch signals. A State Machine 380 controls the de-queueing in a round-robin fashion from the highest priority level "1" to the lowest priority level "4". The read address of incoming bus 332_i is connected to a Buffer block 342_i and to a Comparator block 352_i while the re-synch signal of incoming bus 332_i is connected to the State Machine block 380 and to the Remote Switch Logic block 450 by signal 312_i. The output busses of the buffer blocks 342_i are dotted and connected to the Memory Read Controller block 200 through bus 220. The Comparator block 352_i compares the output address to zero which is default value when there is no address stored into the FIFO. The result is received by State Machine block 380 on signal 362_i. The State Machine 380 also generates the De-queue Priority FIFO read signals 322_i and the buffer output enable signals 382_i. These latter four signals provide through Gate block 390 the read signal 221 to the Memory Read Controller block 200 and to the Destination Output Buffer block 280_2. The State Machine block 380 is clocked by the outgoing data packet clock received on signal 381.
c. The Memory Read Controller block 200 controls the Shared Memory block 250 through bus 210. The read address is available on bus 220 and the read command is available on signal 221. The data packet is transmitted from the memory to adapter 16_2 through the Destination Output Buffer block 280_2 on bus 15_2.

Free Buffer Queue block (400):

The Free Buffer Queue block 400 contains memory addresses ready to be used. Its output bus 410 provides addresses to the En-queue Register for memory write operations. Its input bus 220 receives addresses from the Release Address Selector block 300 when a memory read operation has been completed.

Figure 6:
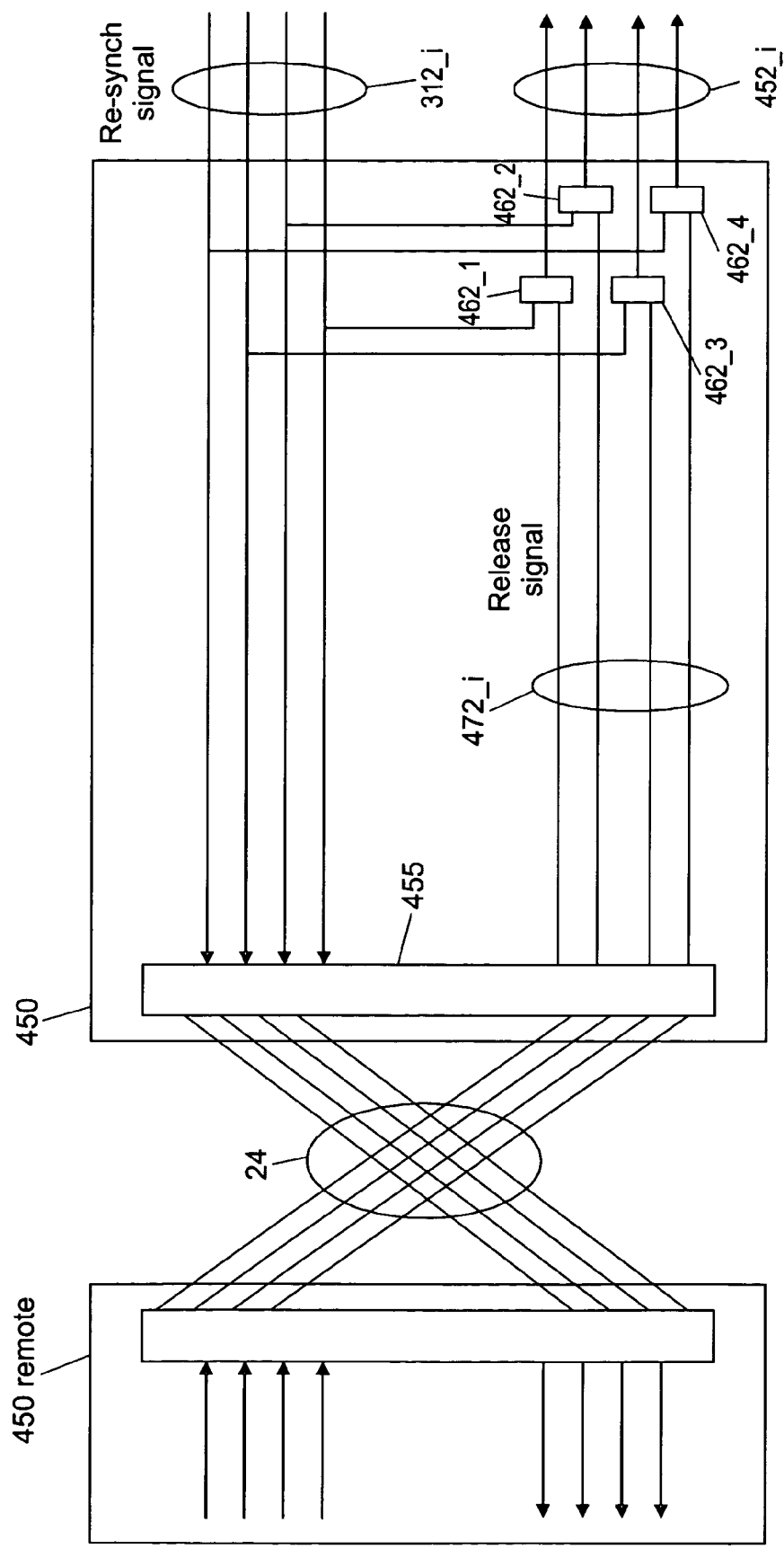
FIG. 6 details the Remote Switch Logic block of FIG. 3.

Remote Switch Logic (450):

The Remote Switch Logic block 450 exchanges the re-synchronization information with the backup switch card block 14_2 through bus 24. This bus connects the output signals of remote switch logic block 450 of switch card 14_1 to the input signals of remote switch logic block 450 of switch card 14_2 and vice-versa. Referring to FIG. 6, the Remote Switch Logic block 450 is composed of a Connector block 455 and four 2-input AND gates (one per priority level) blocks 462_i. The connector block 455 is made of an output bus 312_i and an input bus 472_i. Each output Re-synch signal 312_i is connected to one input of AND gate block 462_i and the other input of AND gate block 462_i is connected to the input bus 472_i. When the backup switch card block 14_2 detects its synchronization data packet, it activates its own output Re-synch signal 312_i which then activates the input signal 472_i of active switch card through bus 24. The input signal 472_i is transmitted to the Release Address Selector block 300 onto bus 452_i through AND gate 462_i as the Release signal.

The principle of operation of the system is now described as previously explained with adapter 16_1 transmitting data packets with different priority levels to adapter 16_2.

Case #1:

Data packets are built by adapter 16_1 with the re-synch bit de-asserted which is the normal operation. The following process applies for each data packet within each switch card blocks 14_1 and 14_2.

Each data packet is received by the Header Detection and Packet Validation block 100_1 on bus 13_1 which performs the following tasks:

- extracting the destination address, the priority level and the re-synch bit to create bus 140_1 made of the destination address bus, four priority level signals and one re-synch signal;
- sending these information to the Lease Address Selector block 350 through bus 140_1;
- informing the Write Memory Controller block 150 through signal 130_1 to perform a write operation.

Next the Lease Address Selector block 350 performs the following tasks:

- decoding the destination address and the priority level to activate one chip select among the four priority signals 360_i which enables Buffer block 351 through gate block 352;
- transmitting the address stored into the En-queue Register block 380_1 to the Write Memory Controller block 150. This address was previously taken from the Free Buffer Queue block 400;
- storing this address along with the re-synch bit into the corresponding De-queue Priority FIFO block 310_i.

Figure 7:
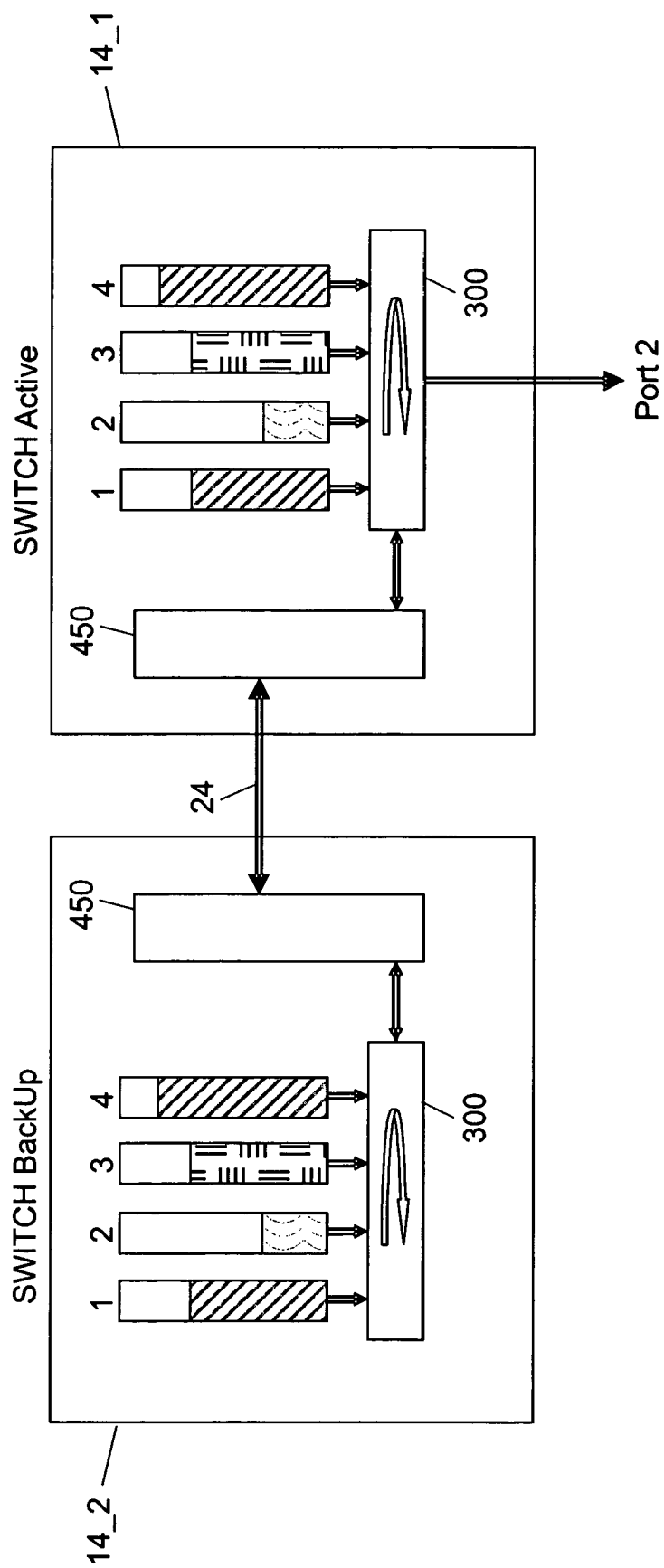
FIG. 7 illustrates a data packet synchronisation within Fifo's content of the two switch cards.

Finally the Write Memory Controller block 150 allows to store the data packet into the Shared Memory block 250. At this stage the addresses stored into each De-queue Priority FIFO are waiting for a transmission to port #2 as illustrated in FIG. 7. Both switches are synchronised and have exactly the same queues.

Figure 8A:
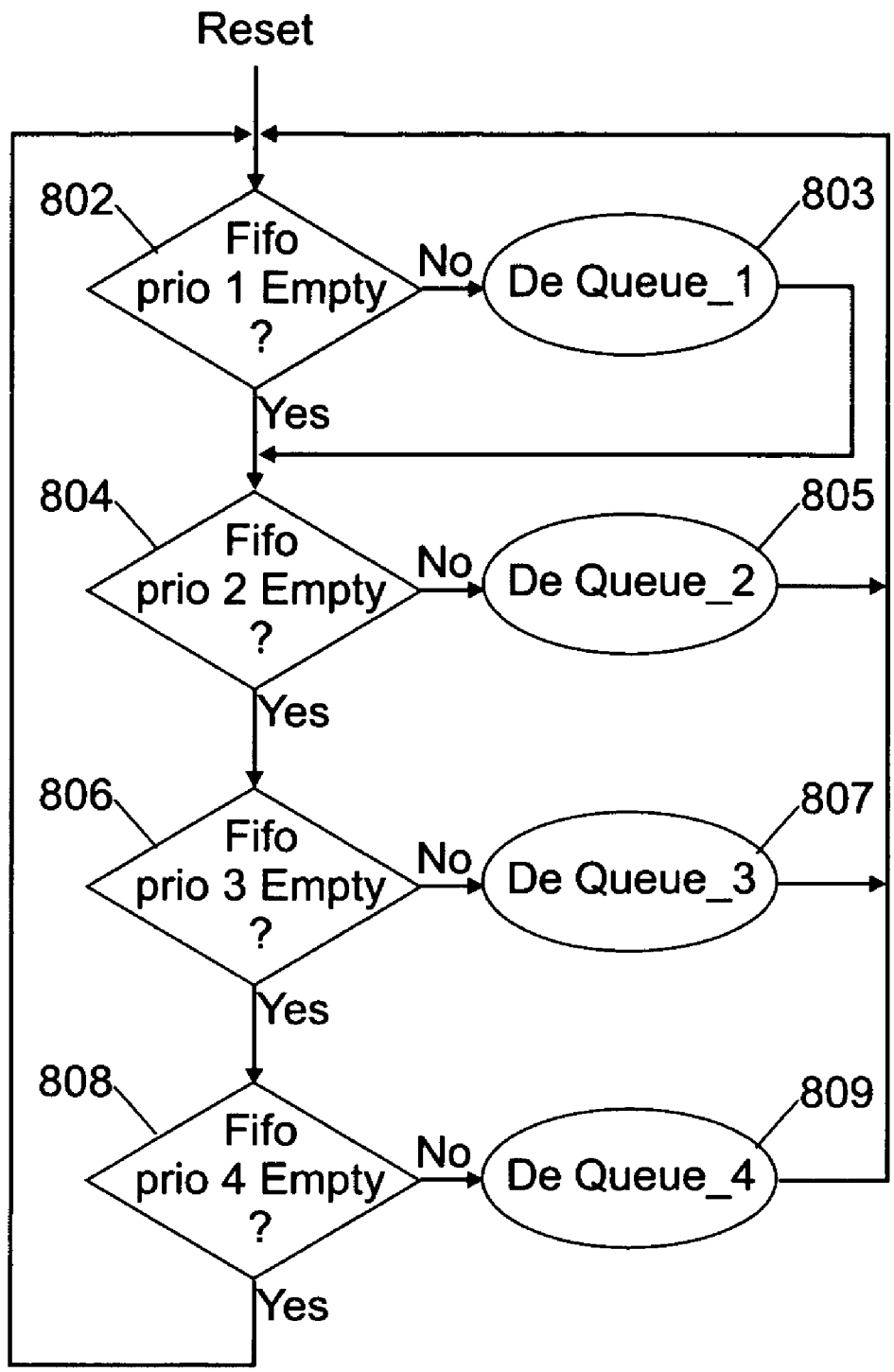
FIG. 8A and 8B are flow charts of the de-queue operations of the state machine of FIG. 5.

The de-queue of each FIFO is a background task performed by the Release Address Selector block 300 and more precisely by State Machine block 380. As illustrated in FIG. 8a, the state machine operates per priority from the highest priority FIFO (block 802) to the lowest priority FIFO (block 808). The objective is to have a higher priority FIFO emptied before processing a next one. As shown on FIG. 8a, the higher priority FIFO is first checked on step 802. If it is empty, then the next priority level FIFO is checked on step 804, otherwise the FIFO is emptied through a de-queueing process on step 803. When the FIFO is empty the next priority level FIFO is checked on step 804. These checking and de-queueing operations are run for all FIFOs.

Figure 8B:
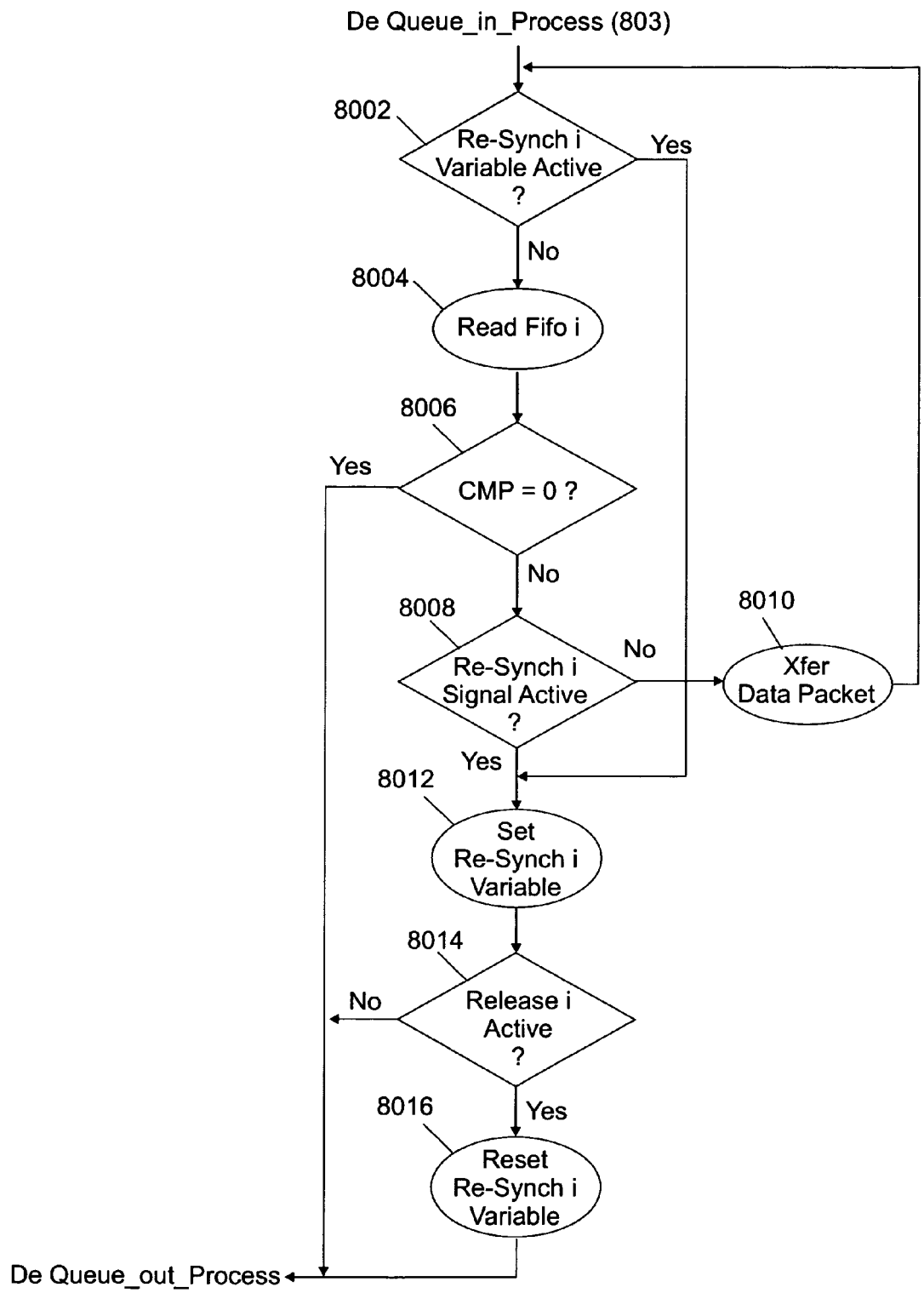

The de-queue process is illustrated on FIG. 8b for first FIFO, and is made of the following operations:

in step 8002: checking if the re-synch variable is active. For the normal flow of data packets the re-synchronization bit is not set (i.e. the re-synch variable is not active) and the state machine goes to step 8004 through branch No, otherwise the process goes to step 8014 (branch Yes);

in step 8004: the FIFO is read and the data contained into the De-queue Destination FIFO block 512_1 is pushed out onto bus 332_1 by activating signal 322_1;

in next step 8006: the address bus of bus 332_1 is compared by comparator block 352_1 to zero which is the default value when the FIFO is empty:

if the control signal 362_1 is not activated (branch No), an address is available and the state machine goes to step 8008; otherwise if the control signal 362_1 is activated (branch Yes), the FIFO is empty and the state machine exits the de-queue process for this priority and next FIFO is checked on step 804.

in step 8008: checking if the re-synch signal of bus 332_1 is active. In normal operation this signal is not set and the state machine goes to step 8010 (branch No) to complete the data packet transfer. The state machine then activates signal 382_1 to perform the following tasks:

1/enabling buffer block 342_1 which outputs the address to Memory Controller block 200 through bus 221;

2/activating the read signal 221 through gate 390;

3/releasing the address into the Free Buffer Queue block 400 for further use;

4/the data packet is read from the shared memory block 250 but only the active switch card enables the Destination Output Buffer block 280_2 to transfer the data packet to adapter 16_2 onto output bus 15_2;

5/at the end of the transfer the state machine goes back to step 8002.

otherwise, if the re-synch signal is active on step 8008, the state machine goes to step 8012 (branch Yes) to perform a re-synchronization operation as described hereafter with case #2.

Figure 9:
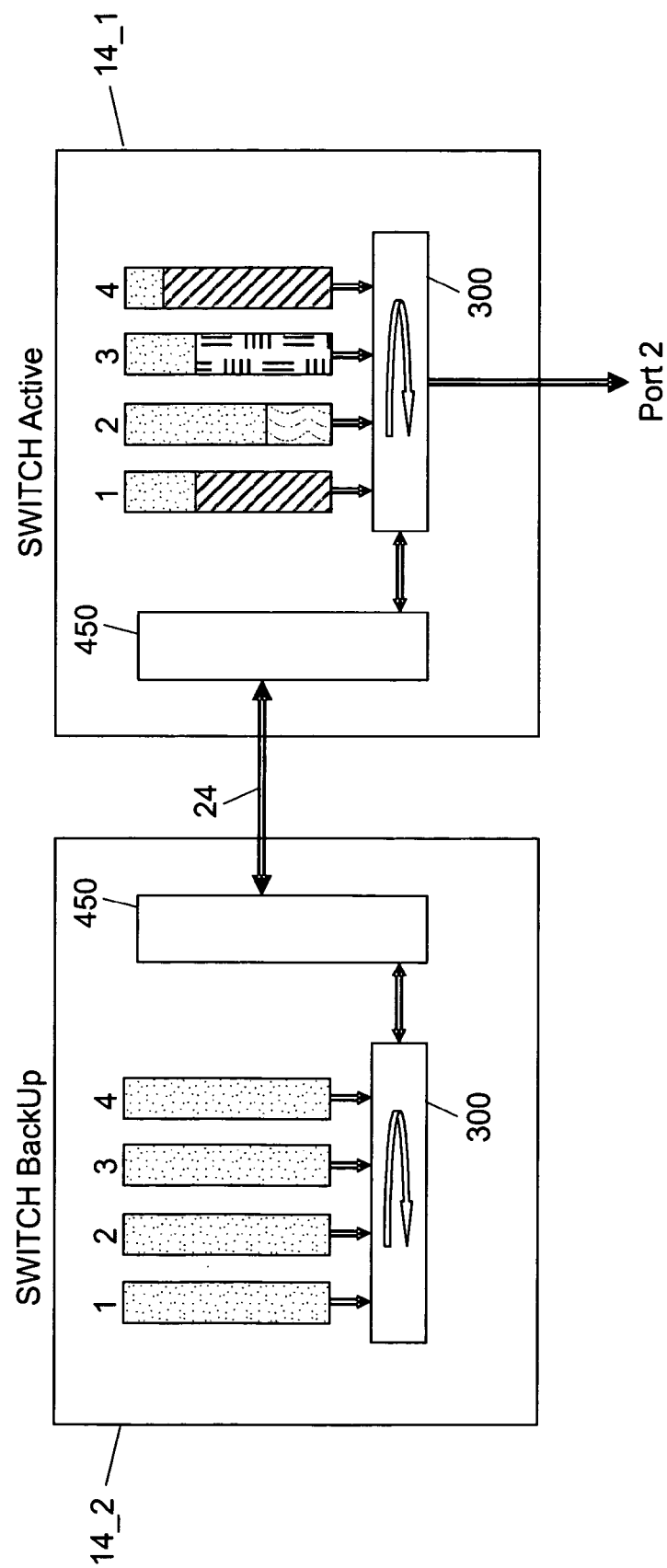
FIG. 9 to FIG. 13 illustrate Fifo's content of the two switch cards during the steps of switch cards re-synchronization.

Case #2:

Let's assume that the backup switch card block 14_2 has been replaced by the operator. As illustrated in FIG. 9, the queues of the backup switch card block 14_2 are empty while the queues of the active switch card block 14_1 are transmitting the normal data traffic.

Then the operator initialises the backup switch card block 14-2 and the data packets are then received by both switch cards, stored into the shared memory of each card and de-queued as previously described.

Figure 10:
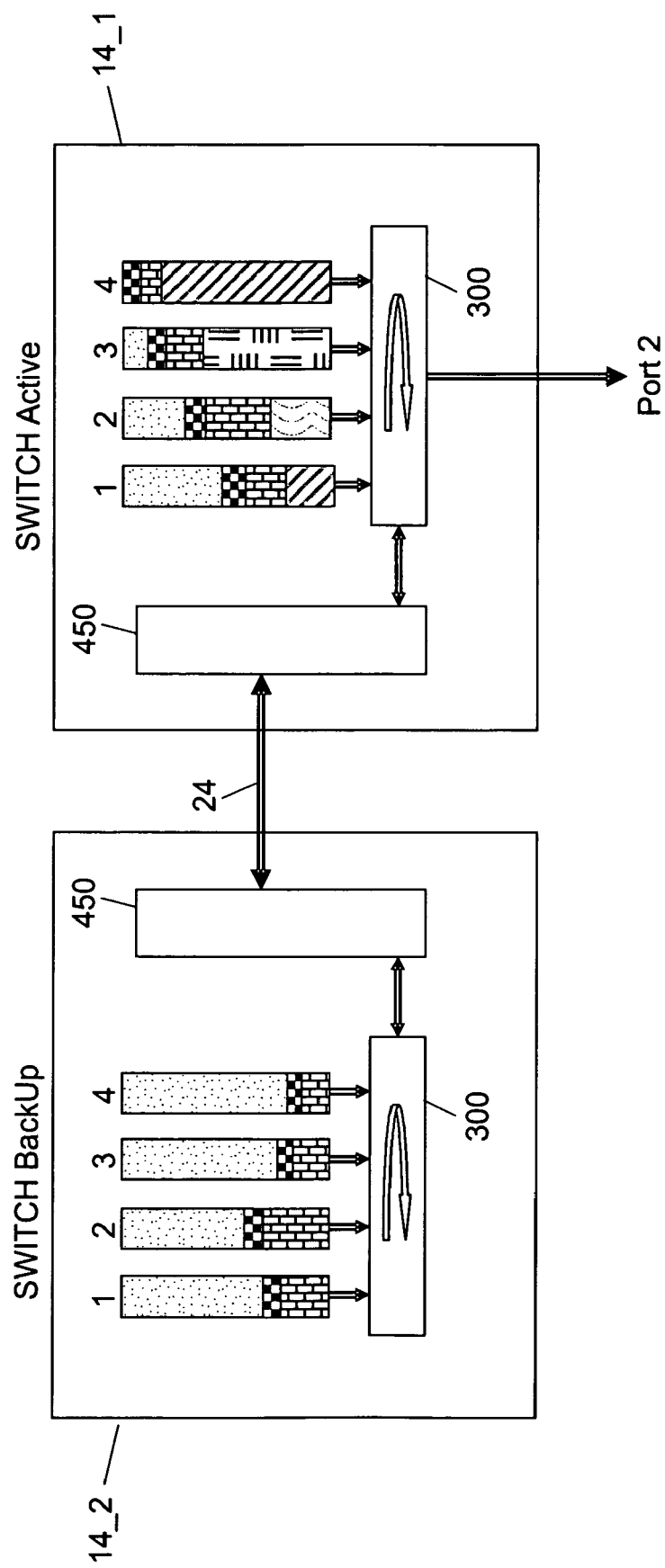

Next, the operator enters the appropriate commands to allow each adapter to send a re-synchronization data packet for each priority level. The re-synchronization data packet is illustrated on FIG. 10 and following FIGS. 11 to 13 as a checkerboard rectangle stored in each FIFO. To recall, the re-synchronization data packet does not contain any valid data payload but has a re-synch bit activated in its header.

Figure 11:
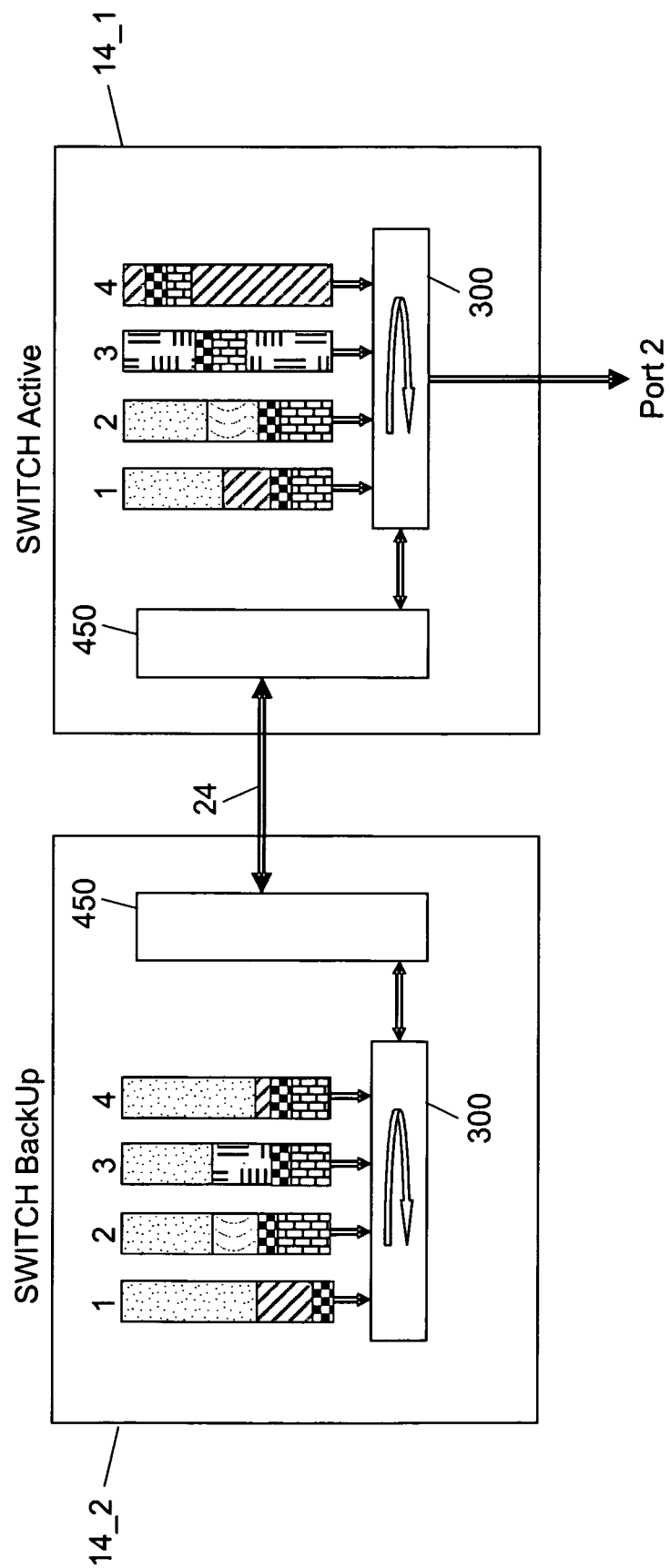
Figure 12:
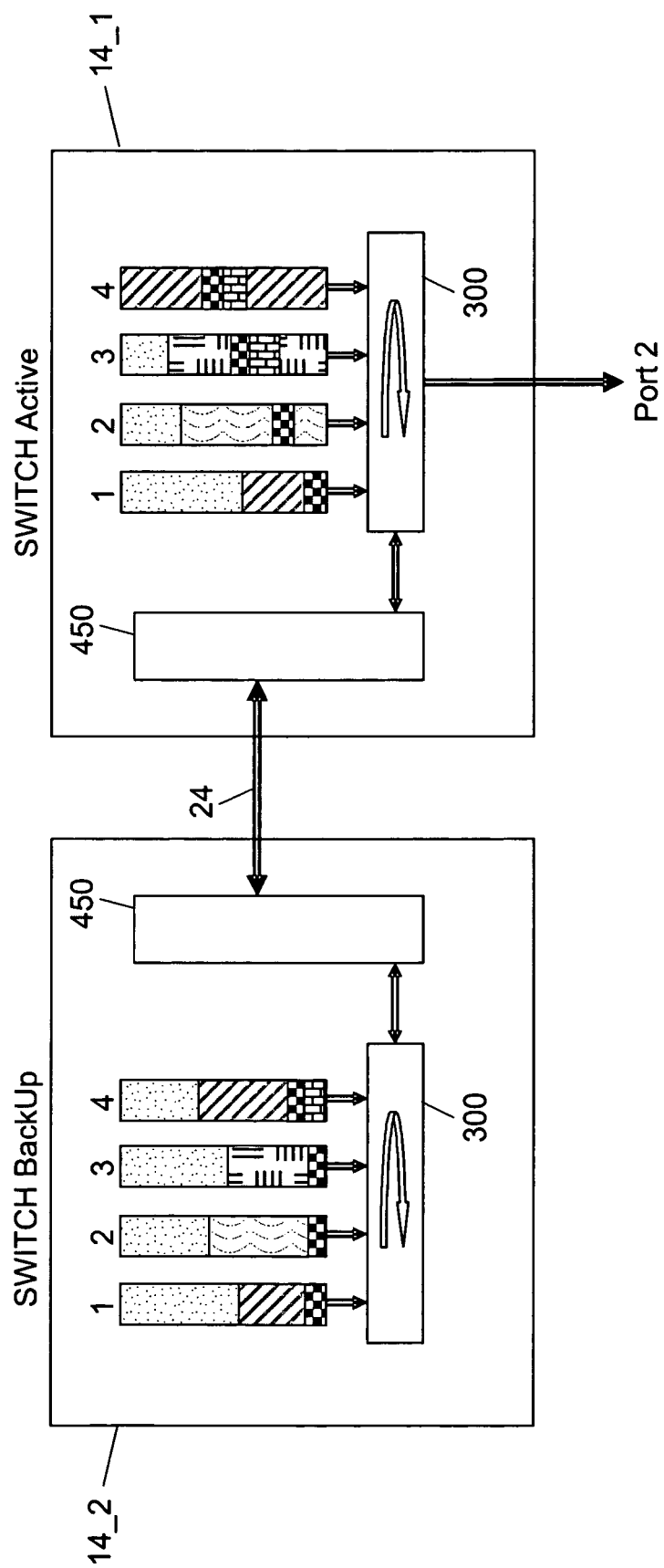
Figure 13:
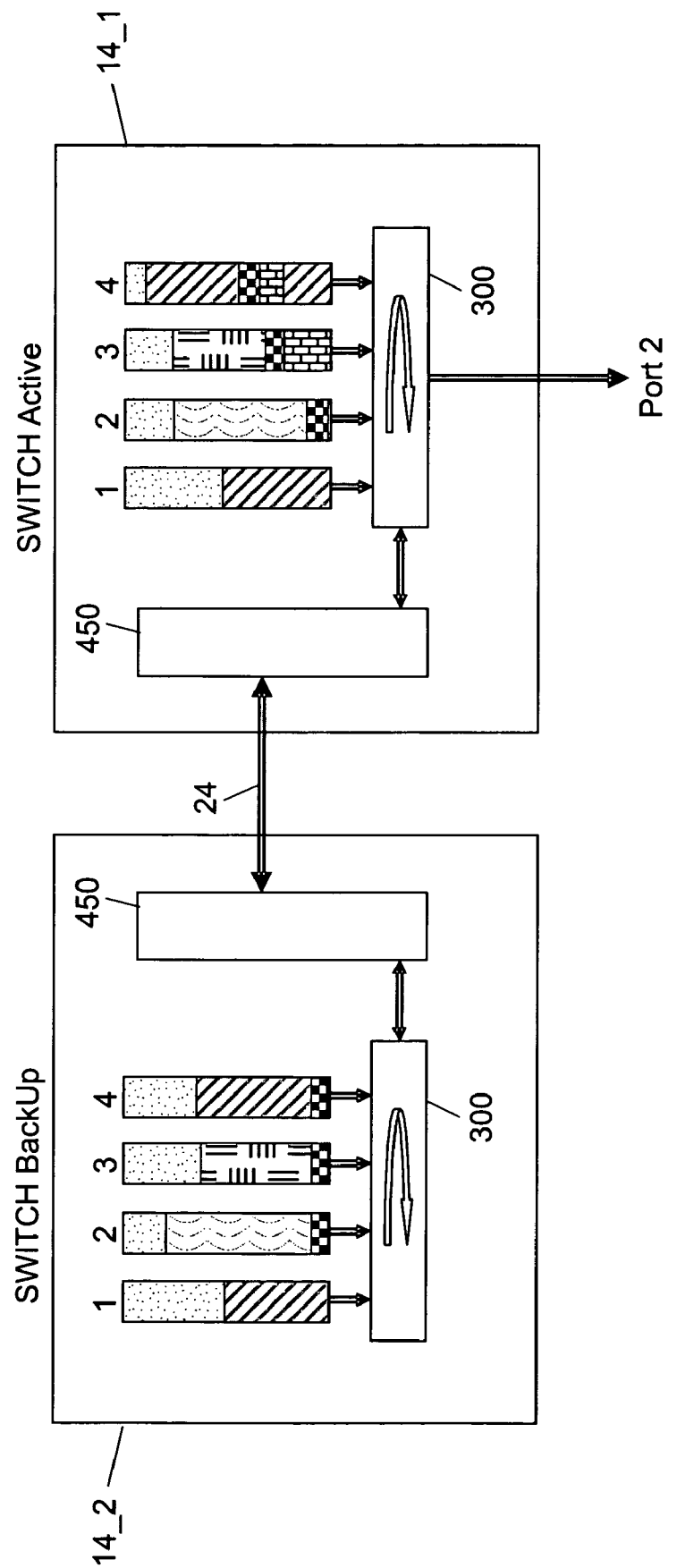

As illustrated in FIG. 11 when the re-synchronization data packet has reached the bottom of a FIFO by the backup switch card block 14_2, the following operations illustrated on FIG. 8b are performed by its State Machine block 380:

in step 8002: checking if the re-synch variable 'i' is active. The previous received packets being data packets the re-synch variable 'i' is not active and the state machine goes to step 8004 through branch No;

in step 8004: the re-synchronization data packet contained into the De-queue Destination FIFO block 512_1 is pushed out onto bus 332_1 by activating signal 322_1. The activated re-synch signal 312_1 enables the AND gate block 462_1 and is transmitted to the active switch card block 14_1 through cable 24;

in step 8006: the control signal 362_1 is not activated, the address of the re-synchronization data packet is available and the state machine goes to step 8008 through branch No;

in step 8008: the re-synch signal being active, the state machine goes to step 8012 through branch Yes;

in step 8012: setting a re-synch variable 'i'. This variable is set to skip the reading of the De-queue Destination FIFO of the backup switch card until the re-synchronization data packet is detected by the active switch card;

in step 8014: checking the status of the Release signal coming from the active switch card block 14_1:

until the Release signal 452_1 is activated the state machine exits the de-queue process from branch No. At a next re-entry of the de-queue process, the state machine 380 of the backup switch card block 14_2 performs step 8002 where the re-synch variable 'i' is checked active, the process goes to step 8014 where the release signal is not active and thus exits the de-queue process from branch No. The backup switch card block 14_2 does not empty its De-queue Destination FIFO until the active switch card block 14_1 detects its re-synchronisation data packet;

as illustrated in FIG. 12, finally the re-synchronization data packet is detected by the active switch card block 14_1 which activates its re-synch signal 312_1. This signal is transmitted to the backup switch card through cable 24 to the other input of AND gate block 462_1. Its output activates the Release signal 452_1. This mechanism occurs simultaneously on both switch cards. At their next re-entry both state machines are now able to jump from step 8014 to step 8016 through branch Yes. The re-synch variable is reset and the state machine exits the de-queue process for this priority. FIG. 13 illustrates the status of each FIFO at this stage. It should be noted that the re-synchronization data packet is not transmitted to the adapter. Both FIFOs for priority #1 are now synchronized. This mechanism repeats for each priority.

The invention claimed is:

1. In a switching system (14) for transmitting a plurality of incoming data packets, the switching system being made of an active switch card (14-1) and a backup switch card (14-2), a re-synchronization system for re-synchronizing the switch cards comprising in each switch card:

a storage means (150, 250, 350, 400, 380, 512) for storing the incoming data packets to create stored packets;

a detection means (100) for detecting re-synchronization information among the incoming data packets, wherein the re-synchronization information comprises data within a re-synchronization data packet, and the detection means comprises header detection and packet validation logic that extracts a destination address, priority level, and resynch-bit for placement as signals on one or more destination buses coupled with a write enable signal; and a synchronization means (200, 280, 300, 450), coupled to the detection means and to the storage means, for synchronizing a transmission of stored data packets out of the active switch card (14-1) with another transmission of stored data packets out of the back-up switch card (14-2) in response to the detected re-synchronization information, wherein the synchronization means controls the transmissions until identical data packets are transmitted, and, thereby, permitting the re-synchronizing of the switch cards.

2. The system of claim 1 wherein the synchronization means for synchronizing the data packets transmission further comprise a communication means (24) for communicating the re-synchronization information between the active switch card (14-1) and the backup switch card (14-2).

3. The system of claim 1 or 2 wherein the data packets comprise a header and a payload and wherein the detection means comprise means for checking a bit status in the header of each incoming data packet.

4. The system of claim 3 wherein the header of each data packet further comprise a destination address and a priority level, and wherein the storage means for storing the incoming data packets comprise memory means for storing the payload of each incoming data packet and enqueueing means for enqueueing per priority level the memory address where the payload of each incoming data packet is stored.

5. The system of claim 4 wherein the synchronizing means for synchronizing the data packets transmission further comprise de-queueing means for de-queueing per priority level the content of the enqueueing means according to the re-synchronization information exchanged between the active and the backup switch cards.

6. The system of claim 5 wherein the de-queueing means further comprise a State Machine (380) to operate a de-queueing process in a round-robin fashion from the highest priority level to the lowest priority level.

7. The system of claim 1 further comprising at least one source network adapter (16-1) to send the incoming data packets to said switching system and at least one destination network adapter (16-2) to receive the data packets transmitted out of the switching system based on an address of the destination adapter among the data packets.

8. The system of claim 7 further comprising a user access device (21) coupled to the at least one source network adapter to enter the re-synchronization information.

9. The system of anyone of claim 1 or 8 wherein the incoming data packets are compatible with an asynchronous transfer mode format.

10. The system of claim 8 further including at least one local area network (LAN) operatively coupled to the at least one source adapter.

11. A re-synchronization system comprising:

a switching card;

memory on said switching card to store incoming data packets;

detector on said switching card to detect re-synchronization data within said incoming data packets, wherein the detector comprises header detection and packet validation logic that extracts a destination address, priority level, and resynch-bit for placement as signals on one or more destination buses coupled with a write enable signal; and a controller having an output port, the controller coupled to the memory and to the detector said controller being operable to synchronize a data transmission at the output port with another data transmission from another switch card in response to detection of the re-synchronization data, wherein the controller controls the transmissions until identical data packets are transmitted, and, thereby, permitting the re-synchronizing of the switch cards.

* * * * *